(12) United States Patent
Schmitcke (10) Patent No.: US 6,301,869 B1
(45) Date of Patent: *Oct. 16, 2001

(54) RECIPROCATING BALER PLUG REMOVING SYSTEM

(75) Inventor: Gerald L. Schmitcke, Menoken, ND (US)

(73) Assignee: Inforcer, Inc., Newburg, ND (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/642,028

(22) Filed: Aug. 18, 2000

Related U.S. Application Data

(63) Continuation-in-part of application No. 09/226,671, filed on Jan. 7, 1999, now Pat. No. 6,134,868.

(51) Int. Cl.$^7$ .................................................. A01D 75/00
(52) U.S. Cl. .............................................. 56/341; 100/88
(58) Field of Search ............................ 56/341, 343, 432, 56/14.4, 364, 16.4 R, 220, 344; 100/88, 89

(56) References Cited

U.S. PATENT DOCUMENTS

| | | | |
|---|---|---|---|
| 4,413,553 | * | 11/1983 | Crawford .................................. 100/4 |
| 4,433,619 | * | 2/1984 | Anstey et al. ........................... 100/88 |
| 4,444,098 | * | 4/1984 | Soteropulos ............................ 100/88 |
| 4,476,761 | * | 10/1984 | Bird ......................................... 83/614 |
| 4,516,389 | * | 5/1985 | Core ......................................... 56/341 |
| 4,604,858 | * | 8/1986 | Esau et al. .............................. 56/341 |
| 4,782,652 | * | 11/1988 | White ...................................... 56/341 |
| 4,878,410 | * | 11/1989 | Darnell ................................... 83/635 |
| 5,242,121 | * | 9/1993 | Neier ....................................... 241/28 |
| 5,340,042 | * | 8/1994 | Bergkamp et al. ................... 241/283 |
| 5,447,022 | * | 9/1995 | Webb ....................................... 56/341 |
| 5,826,418 | * | 10/1998 | Clostermeyer et al. ............... 56/341 |
| 5,894,873 | * | 4/1999 | Weeks .................................... 144/4.6 |

* cited by examiner

*Primary Examiner*—Thomas B. Will
*Assistant Examiner*—Nathan Mammen
(74) *Attorney, Agent, or Firm*—Michael S. Neustel (57) ABSTRACT

A baler plug removing system for unplugging a conventional hay baler without the user having to risk bodily injury or leave the comfort of the tractor cab. The device includes a support member having a front edge, a plurality of wheels rotatably attached to the support member, a pair of opposing tracks that are secured to the conventional baler that receive the plurality of wheels, a pair of front bearing for guiding the front of the support member, a pair of rear bearings for guiding the rear of the support member, a first blade member slidably positioned upon the front edge of the support member, a motor mechanically connected to the first blade member to reciprocate the first blade member upon the support member and a pair of hydraulic cylinders connected to the support member for extending/retracting the support member along the tracks. It can be appreciated that other well known means of extending/retracting the support member along the tracks, such as an actuator chain gear system, may be utilized instead of a pair of hydraulic cylinders. When hay becomes plugged between the feed rollers of the conventional baler, the user actuates the pair of hydraulic cylinders that extend the support member and the reciprocating first blade member into the feed rollers thereby pushing and severing the plugged hay. The user retracts the support member and the first blade member from the feed rollers when the hay plugged between the feed rollers has been removed.

30 Claims, 6 Drawing Sheets

RECIPROCATING BALER PLUG REMOVING SYSTEM

CROSS-REFERENCE TO RELATED U.S. PATENT APPLICATION

I hereby claim benefit under Title 35, United States Code, Section 120 of U.S. patent application Ser. No. 09/226,671 filed Jan. 7, 1999 entitled "Baler Plug Removing System". This application is a continuation-in-part of the Ser. No. 09/226,671 application filed Jan. 7, 1999 now U.S. Pat. No. 6,134,868

BACKGROUND OF THE INVENTION

1. Field of the Invention

The present invention relates generally to baler devices and more specifically it relates to a baler plug removing system for unplugging a conventional hay baler without the user having to risk bodily injury or leave the comfort of the tractor cab.

Hay balers, particularly round hay balers, are notorious for plugging up in the front pickup portion and the feed rollers. Depending upon weather and hay conditions, sometimes the hay will wrap around the feed rollers. Other times the hay will "build up" in the pickup portion of the baler without entering the feed rollers. Typically, the user must turn off the power take-off to the baler and get out of the tractor to manually remove the plugged hay. During undesirable weather conditions, this can be physically demanding upon the user because of the immediate climate changes. Many users of balers find it easier to leave the power take-off engaged when attempting to unplug the baler. This is extremely dangerous and often leads to the user either losing a limb or becoming completely drawn into the baler usually leading to death of the user. Hence, there is a need for a baler plug removing system that eliminates the need for the user to leave the comfort of the tractor cab and risk bodily injury.

2. Description of the Prior Art

Balers have been in use for years. Typically, the conventional round baler will have a plurality of belts rotating about a plurality of rollers, a pickup for receiving the hay row, and a pair of opposing counter-rotating feed rollers that feed the hay from the pickup between the belts thereby forming the round bale. Often times the hay will become plugged within the pickup or the feed rollers making it difficult for the user to continue baling. The user must stop baling and manually unplug the baler. This is not only time consuming but also physically demanding upon the user. In addition, many farm accidents occur when a user is attempting to unplug the baler while the baler is still in operation. There currently is no system that allows a user to unplug a conventional baler without leaving the tractor cab.

Examples of attempted baler unpluggers include U.S. Pat. Nos. 4,516,389 to Core; 4,444,098 to Soteropulos; 5,447,022 to Webb; 4,782,652 to White; 4,604,858 to Esau et al; 5,826,418 to Clostermeyer et al which are all illustrative of such prior art.

Core (U.S. Pat. No. 4,516,389) discloses a round hay-baling machine. Core teaches a pickup assembly, a wind guard assembly, a latch assembly, and a twine tie assembly that has an elongated cable at opposite ends of the twine tie and to the latch assembly. When the baler is plugged, the twine tie assembly is actuated to pull the cable thereby releasing the latch assembly to allow the wind guard assembly to pivot away from the pickup assembly.

Soteropulos (U.S. Pat. No. 4,444,098) discloses a cylindrical baler with selfcleaning gate. Soteropulos teaches a frame with a pair of opposing sidewalls, a plurality of side-by-side endless belts on rollers, and a bale discharge gate.

Webb (U.S. Pat. No. 5,447,022) discloses a crop cutting apparatus for a round baler. Webb teaches a crop severing device that extends into the expandable chamber to cut crop material on the surface of the cylindrical package as it is being formed.

While these devices may be suitable for the particular purpose to which they address, they are not as suitable for unplugging a conventional hay baler without the user having to risk bodily injury or leave the comfort of the tractor cab. There currently is no system for unplugging a baler without the user having to physically remove the hay from the pickup and feed rollers.

In these respects, the baler plug removing system according to the present invention substantially departs from the conventional concepts and designs of the prior art, and in so doing provides an apparatus primarily developed for the purpose of unplugging a conventional hay baler without the user having to risk bodily injury or leave the comfort of the tractor cab.

SUMMARY OF THE INVENTION

In view of the foregoing disadvantages inherent in the known types of baler devices now present in the prior art, the present invention provides a new baler plug removing system construction wherein the same can be utilized for unplugging a conventional hay baler without the user having to risk bodily injury or leave the comfort of the tractor cab.

The general purpose of the present invention, which will be described subsequently in greater detail, is to provide a new baler plug removing system that has many of the advantages of the baler devices mentioned heretofore and many novel features that result in a new baler plug removing system which is not anticipated, rendered obvious, suggested, or even implied by any of the prior art baler devices, either alone or in any combination thereof.

To attain this, the present invention generally comprises a support member having a front edge, a plurality of wheels rotatably attached to the support member, a pair of opposing tracks that are secured to the conventional baler that receive the plurality of wheels, a pair of front bearing for guiding the front of the support member, a pair of rear bearings for guiding the rear of the support member, a first blade member slidably positioned upon the front edge of the support member, a motor mechanically connected to the first blade member to reciprocate the first blade member upon the support member and a pair of hydraulic cylinders connected to the support member for extending/retracting the support member along the tracks. It can be appreciated that other well known means of extending/retracting the support member along the tracks, such as an actuator chain gear system, may be utilized instead of a pair of hydraulic cylinders. When hay becomes plugged between the feed rollers of the conventional baler, the user actuates the pair of hydraulic cylinders that extend the support member and the reciprocating first blade member into the feed rollers thereby pushing and severing the plugged hay. The user retracts the support member and the first blade member from the feed rollers when the hay plugged between the feed rollers has been removed.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a baler plug removing system that will overcome the shortcomings of the prior art devices.

Another object is to provide a baler plug removing system that unplugs a conventional baler.

An additional object is to provide a baler plug removing system that can be added to an existing baler.

A further object is to provide a baler plug removing system that reduces the amount of "down time" incurred by unplugging the baler.

Another object is to provide a baler plug removing system that allows the user to unplug a baler without leaving the comfort of the tractor cab.

A further object is to provide a baler plug removing system that reduces the amount of injuries incurred by farmers from unplugging balers.

Another object is to provide a baler plug removing system is adaptable to most designs of balers.

A further object is to provide a baler plug removing system that severs hay plugged between a pair of feed rollers of a conventional baler.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Turning now descriptively to the drawings, in which similar reference characters denote similar elements throughout the several view, FIGS. 1 through 7 illustrate a baler plug removing system 10, which comprises a support member 20 having a front edge, a plurality of wheels 30a–b rotatably attached to the support member 20, a pair of opposing tracks 60a–b that are secured to the conventional baler 12 that receive the plurality of wheels 30a–b, a pair of front bearing for guiding the front of the support member 20, a pair of rear bearings 54a–b for guiding the rear of the support member 20, a first blade member 30 slidably positioned upon the front edge of the support member 20, a motor 42 mechanically connected to the first blade member 30 to reciprocate the first blade member 30 upon the support member 20 and a pair of hydraulic cylinders 24 connected to the support member 20 for extending/retracting the support member 20 along the tracks 60a–b. It can be appreciated that other well known means of extending/retracting the support member 20 along the tracks 60a–b, such as an actuator chain gear system, may be utilized instead of a pair of hydraulic cylinders 24. When hay becomes plugged between the feed rollers 14a–b of the conventional baler 12, the user actuates the pair of hydraulic cylinders 24 that extend the support member 20 and the reciprocating first blade member 30 into the feed rollers 14a–b thereby pushing and severing the plugged hay. The user retracts the support member 20 and the first blade member 30 from the feed rollers 14a–b when the hay plugged between the feed rollers 14a–b has been removed.

Figure 1:
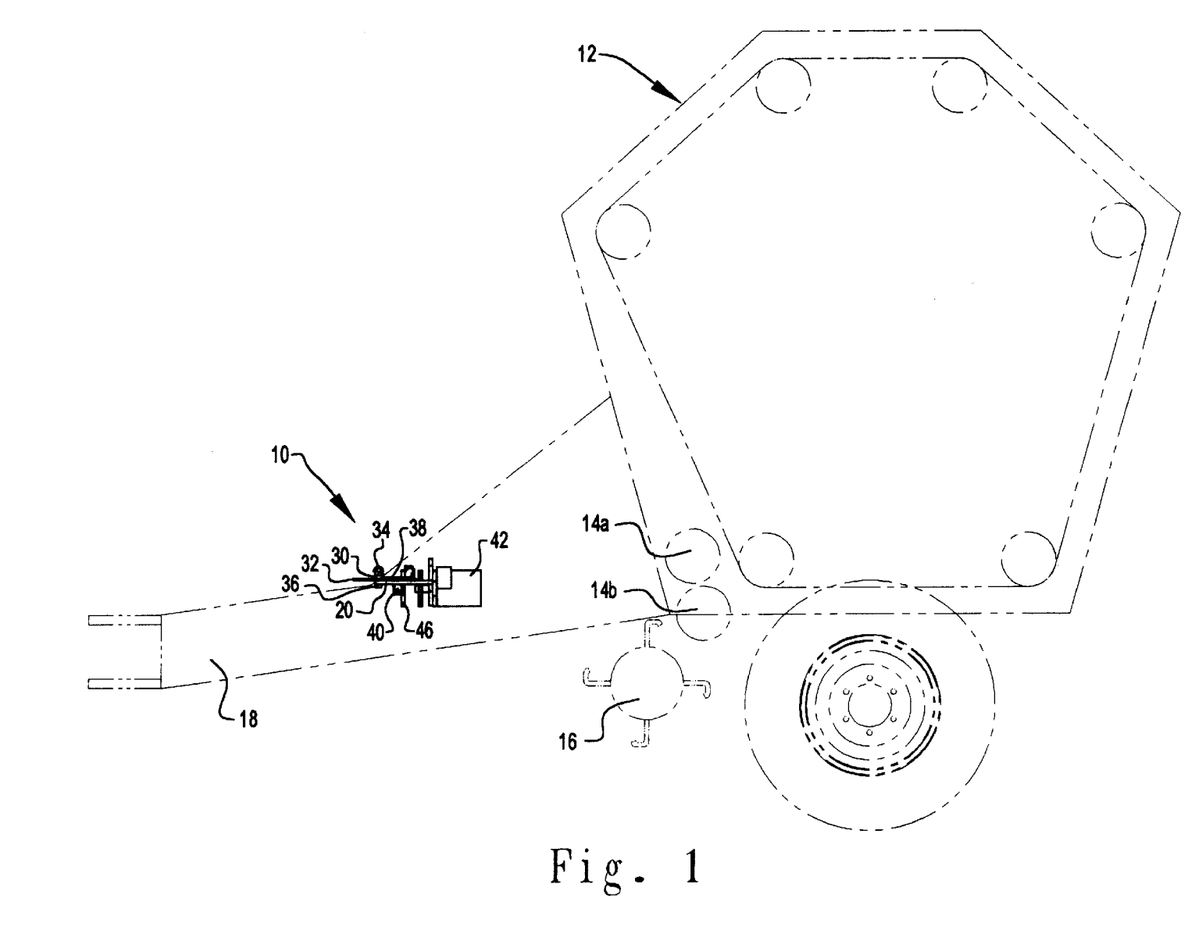
FIG. 1 is a side view of the present invention attached to a conventional round baler.

As best shown in FIG. 1, the present invention is attached to the underside of the hitch of the conventional baler 12. The tracks 60a–b are attached parallel to one another to the hitch 18 along a plane that intersects the pair of feed rollers 14a–b on the conventional baler 12. The tracks 60a–b are positioned above the pickup 16 of the conventional baler 12 as best shown in FIG. 1 of the drawings.

Figure 2:
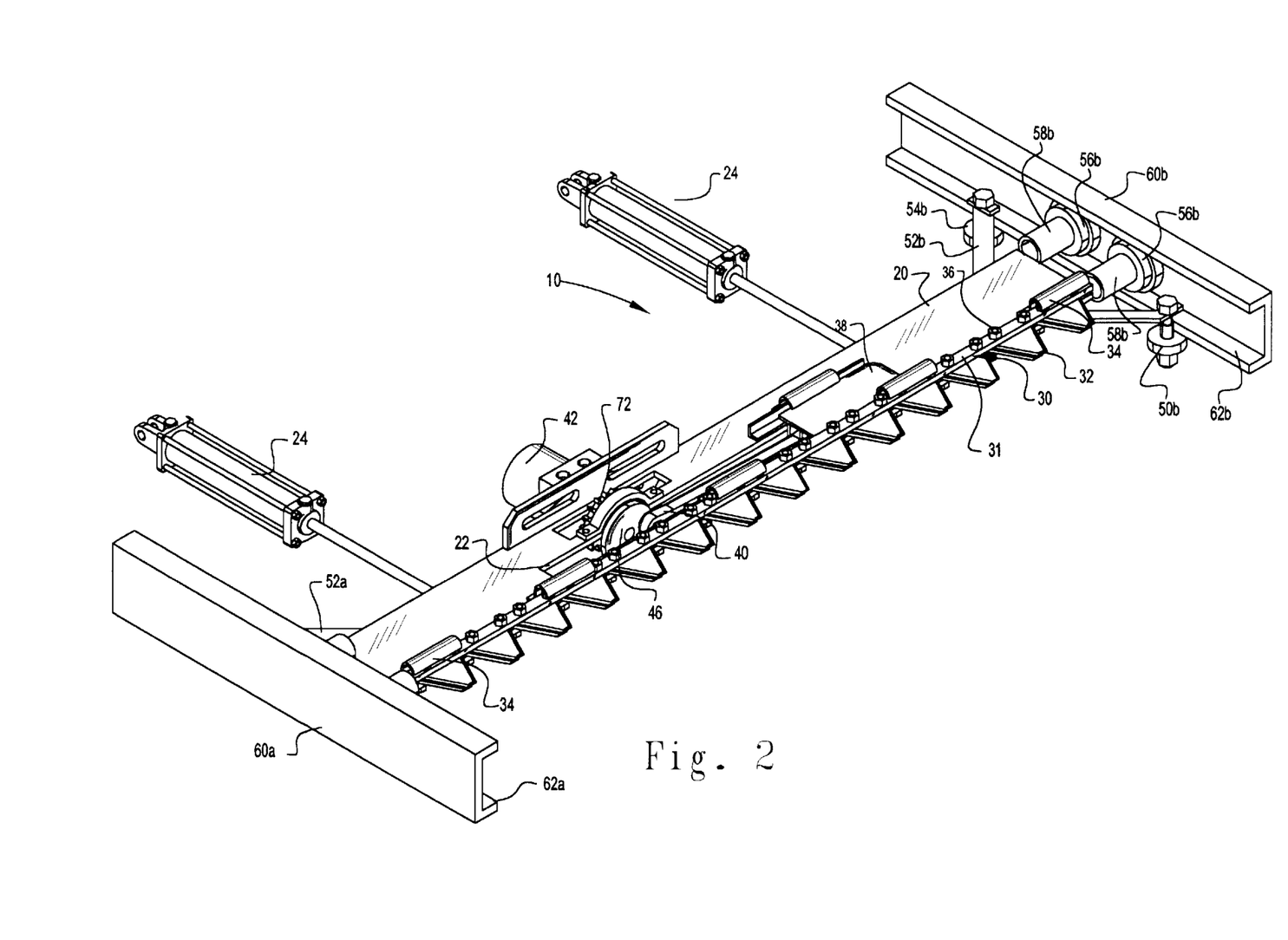
FIG. 2 is an upper perspective view of the present invention.

As best shown in FIGS. 2, 4, 5, 6 and 7 of the drawings, the support member 20 is preferably a flat elongate structure. The support member 20 has a front edge a rear edge, a top surface and a bottom surface. A pair of brackets are attached to the bottom surface of the support member 20. The brackets receive the pair of hydraulic cylinders 24 that are attached at the opposing ends to the hitch of the conventional baler as shown in FIG. 2 of the drawings.

As shown in FIGS. 2, 4, 5, 6 and 7 of the drawings, the first blade member 30 is slidably positioned upon the front edge of the support member 20. The first blade member may be comprised of a sickle bar 31 with a plurality of sickle blades 32 attached to the sickle bar 31 by a plurality of fasteners 36 as shown in FIGS. 2, 4, 5, 6 and 7. The sickle blades 32 may have any well-known structure commonly utilized in the industry. A plurality of sickle guards 34 are attached to the support member 20 and retain the first blade member 30 within a desired position during operation as shown in FIGS. 2, 4, 5, 6, and 7 of the drawings. It can also be appreciated that the first blade member 30 may be comprised of a solid blade structure with a plurality of serrates or other cutting structures commonly utilized in various industries.

Figure 3:
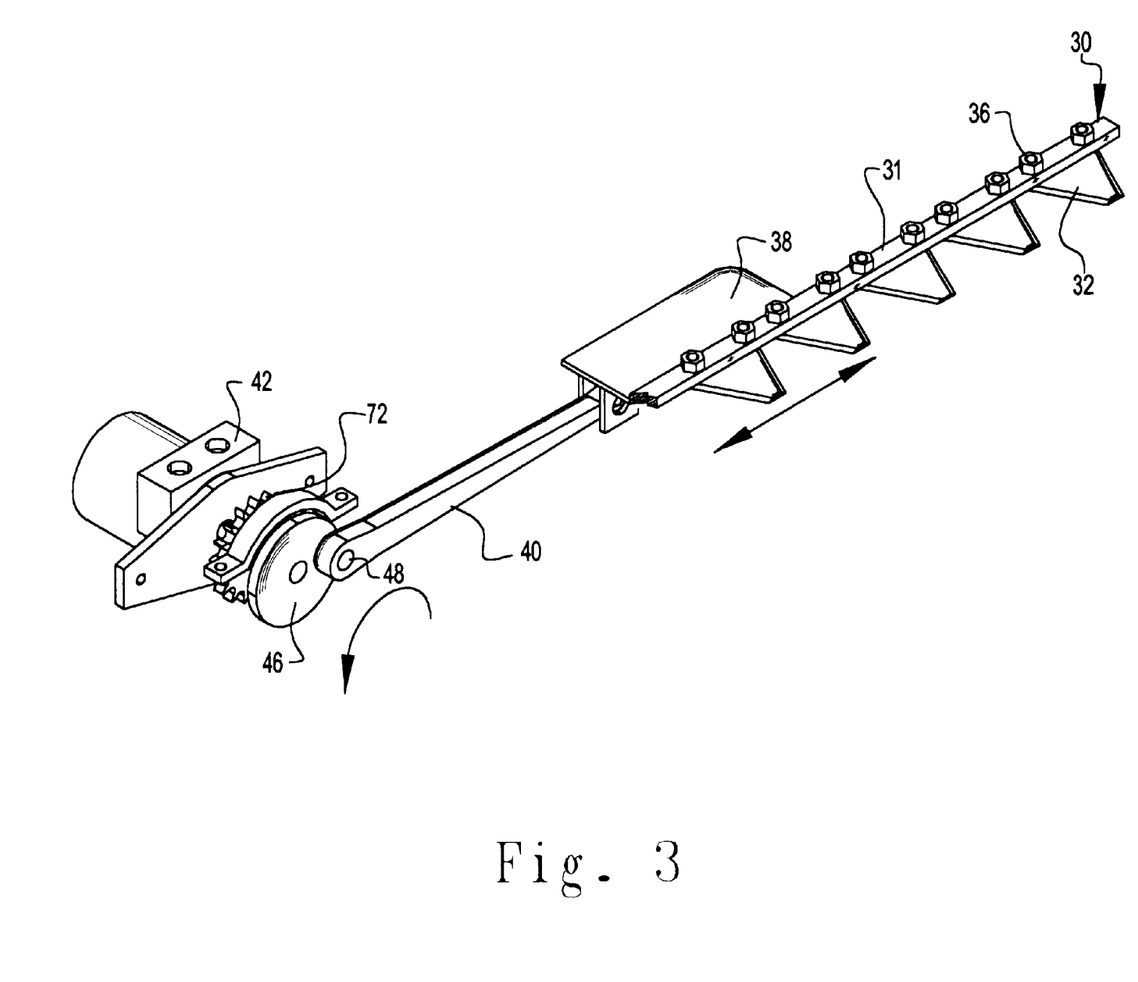
FIG. 3 is an upper perspective view of the present invention showing the oscillating member and the sickle bar partially shown.
Figure 4:
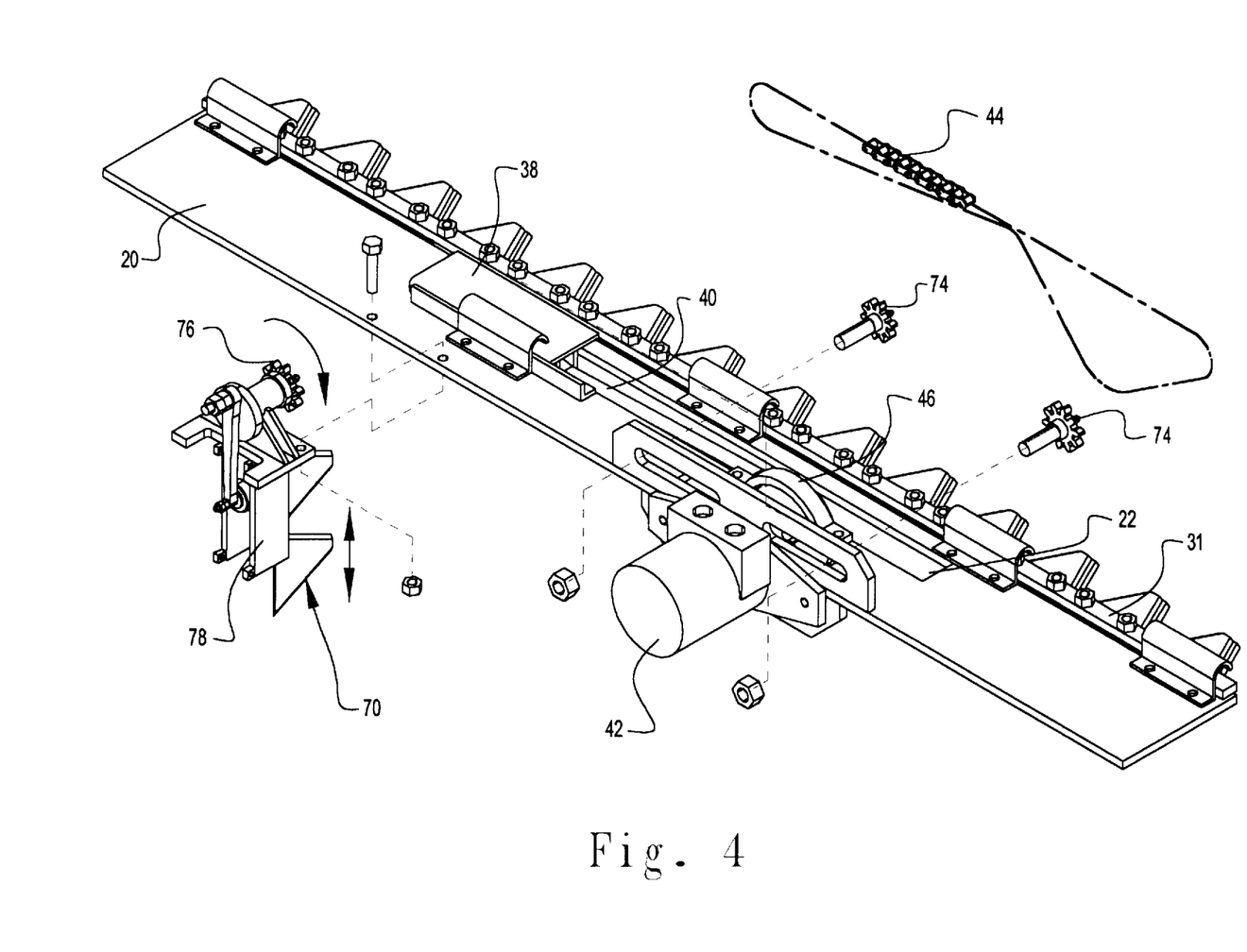
FIG. 4 is an exploded upper rear perspective view of an alternative embodiment of the present invention.
Figure 5:
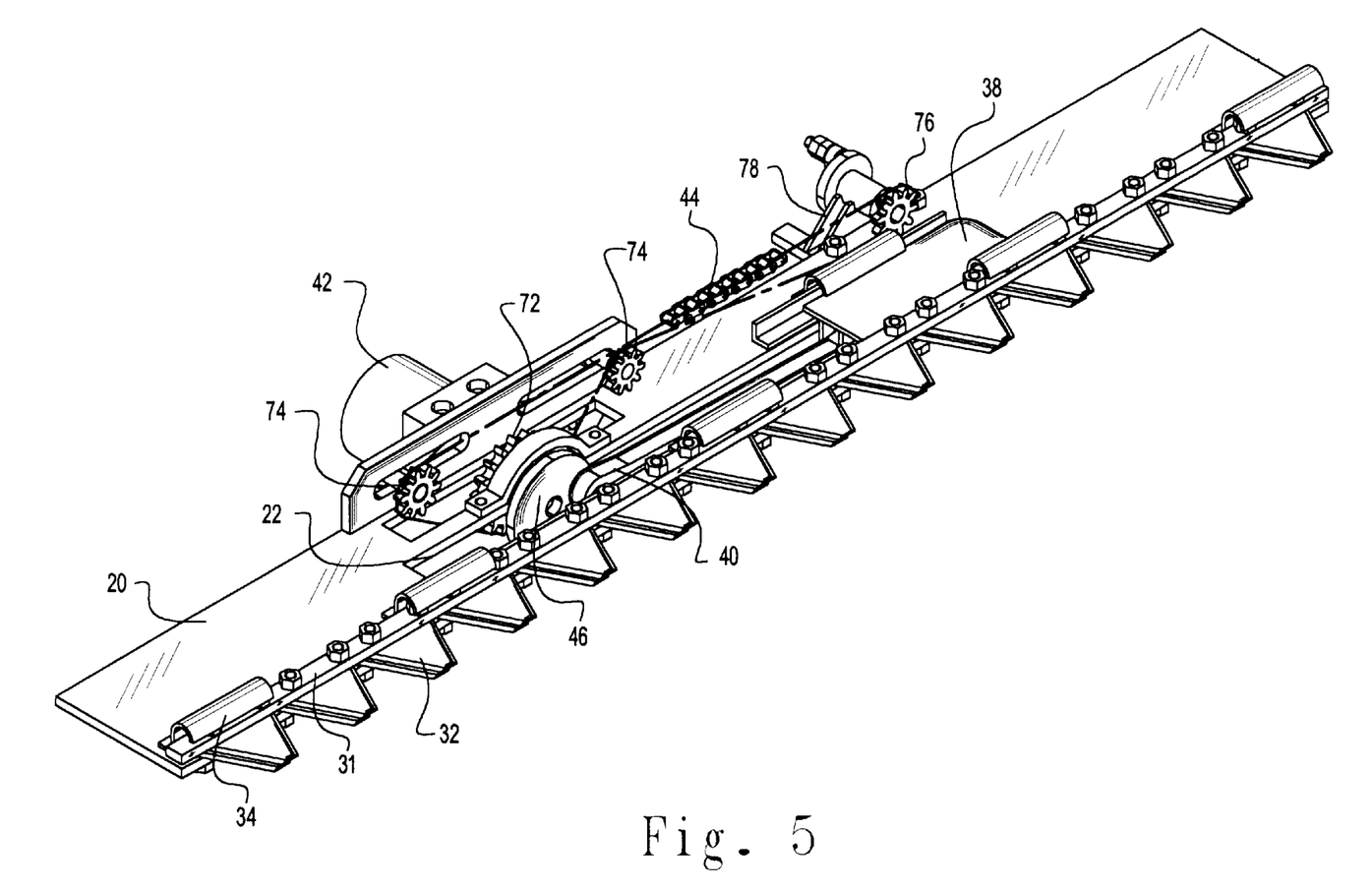
FIG. 5 is a front upper perspective view of the alternative embodiment of the present invention.
Figure 6:
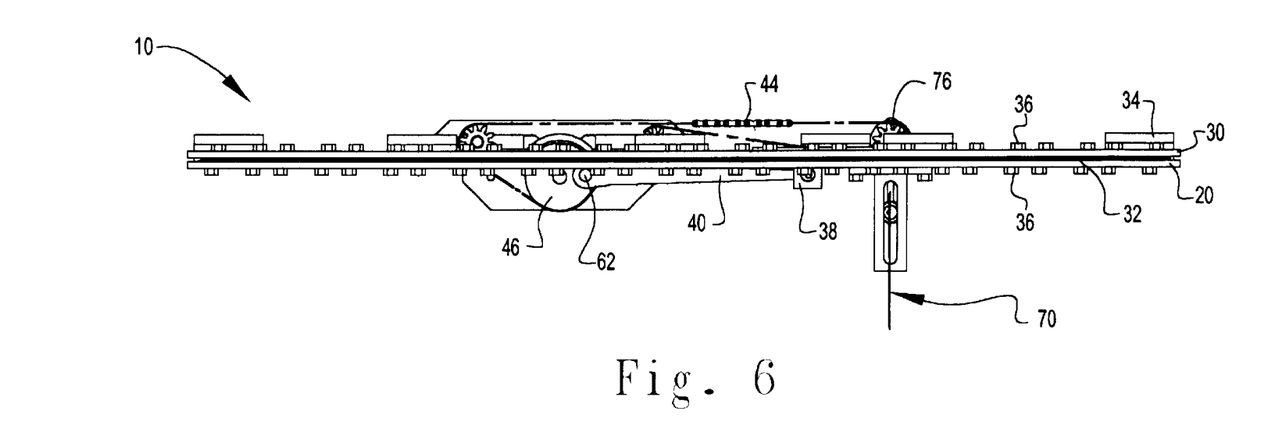
FIG. 6 is a front view of the alternative embodiment showing the vertical blade member.

A motor 42 or other means reciprocates the first blade member 30 repeatedly upon the support member 20. The first blade member 30 is reciprocated parallel with respect to the support member 20 and the feeder rollers 14a–b. The motor 42 is secured to the support member as best shown in FIG. 4 of the drawings. An oscillating disk 46 is attached to the drive shaft of the motor 42 which is rotated along with the drive shaft of the motor 42 as best shown in FIG. 3 of the drawings. An elongated oscillating member 40 is pivotally attached to the oscillating disk 46 by a pin 48 as further shown in FIG. 3 of the drawings.

The distal end of the oscillating member 40 opposite of the oscillating disk 46 is attached to a sickle bracket 38 which is secured to the first blade member 30 as shown in FIG. 3 of the drawings. The sickle bracket 38 is slidably aligned within a slot 22 within the support member 20 as shown in FIG. 4 of the drawings. As the oscillating disk 46 is rotated by the motor 42 the first blade member 30 is reciprocated upon the support member 20.

Figure 7:
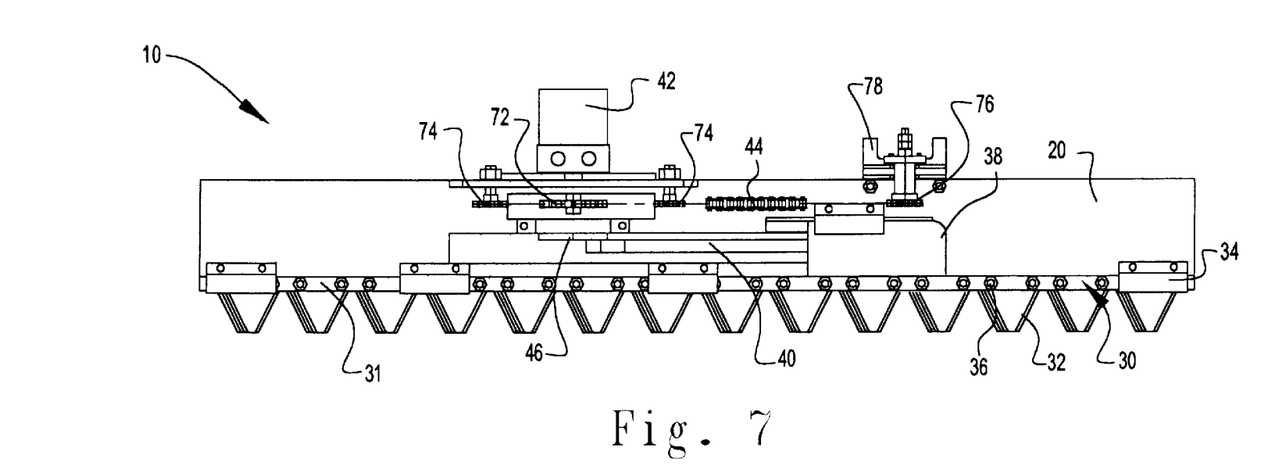
FIG. 7 is a top view of the alternative embodiment.

A first alternative embodiment of the present invention is shown in FIG. 7 of the drawings showing a second blade member 70 having a vertically orientated position which is substantially orthogonal to the first blade member 30. As with the first blade member 30, the second blade member 70 also reciprocates with respect to the support member 20. As shown in FIG. 7 of the drawings, a main sprocket 72 is attached to the motor 42 and is mechanically connected to a drive sprocket 76 by a length of chain 44. One or more idlers 74 are attached to the support member 20 for maintaining the chain 44 in a desired state and position. A support structure 78 is attached to the support member 20 for supporting the drive sprocket 76 and the second blade member 70. The drive sprocket 76 is mechanically connected to the second blade member 70 causing the second blade member 70 to reciprocate with respect to the support member 20. It can be appreciated that there may be one or more second blade members 70 reciprocating from the support member 20.

As best shown in FIG. 2 of the drawings, a plurality of axles 58a–b are attached to the sides of the support member 20 that rotatably receive a corresponding plurality of wheels 56a–b. The wheels 56a–b are rotatably positioned within the tracks 60a–b as shown in FIG. 2 of the drawings thereby guiding the support member 20 and the first blade member 30 into the feed rollers 14a–b for removing the plugged hay.

As best shown in FIG. 2 of the drawings, a pair of front bearings 50a–b are rotatably attached to the support member 20 adjacent the front edge and the first blade member 30. The pair of front bearings 50a–b engage the corresponding lip members 62a–b of the tracks 60a–b thereby guiding the support member 20 and preventing the wheels 56a–b from becoming damaged during extreme forces applied to the support member 20 by the hydraulic cylinders 24. In addition, the front bearings 50a–b prevent binding of the support member 20 between the tracks 60a–b during uneven forces.

As shown in FIG. 2 of the drawings, a pair of arms 52a–b extend from the rear portion of the support member 20 toward the tracks 60a–b. A pair of rear bearings 54a–b are rotatably attached to the distal ends of the arms 52a–b thereby rotatably engaging the lip members 62a–b of the tracks 60a–b. The rear bearings 54a–b preventing sideways movements similar to the front bearings 50a–b thereby maintaining the support member 20 substantially aligned during operation during engagement of the hay between the feeder rollers 14a–b by the first blade member 30.

As shown in FIG. 2 of the drawings, a pair of hydraulic cylinders 24 are attached to the pair of brackets attached to the support member 20. The hydraulic cylinders 24 are fluidly connectable to the hydraulic system of the tractor pulling the conventional baler.

In a second alternative embodiment not shown in the figures, an actuator is connected to the hitch of the conventional baler. An elongated shaft extends from the actuator parallel to the support member 20. A pair of drive sprockets are attached to the proximal and distal ends of the shaft. A pair of idler sprockets are rotatably attached to the tracks 60a–b adjacent the pair of feed rollers 14a–b. A pair of chains, each having a first end and a second end, are in engagement with the pair of drive sprockets respectively. The first end of the chains is secured to the rear portion of the support member 20. The chains then extend from the support member 20 toward and about the respective drive sprockets. The chains then extend toward and about the idler sprockets. The second end of the chains is then secured to the front portion of the support member 20. When the actuator rotates the shaft, the chain pulls the support member 20 with the first blade member 30 into the feed rollers 14a–b or pulls the support member 20 away from the feed rollers 14a–b.

In use, the user operates the conventional baler with the support member 20 in the retracted position so as to not interfere with the delivery of hay into the baler 12. When hay becomes plugged within the feed rollers 14a–b or the pickup 16 of the baler 12, the stops the movement of the tractor but maintains the power take-off to the baler 12. The user then actuates the pair of hydraulic cylinders 24 so that they extend the support member 20 and the first blade member 30 into between the feed rollers 14a–b. The motor is either manually or automatically actuated to begin reciprocating the first blade member 30 and the second blade member 70. The reciprocating first blade member 30 does not physically engage the feed rollers 14a–b, but rather comes within inches of the feed rollers 14a–b thereby forcing and severing any plugged hay into the feed rollers 14a–b. In the first alternative embodiment, the second blade member 70 engages hay plugging the pickup 16 portion of the baler 12. After the hydraulic cylinders 24 are fully extended, the user then actuates the hydraulic cylinders 24 so as to retract the support member 20 and the first blade member 30 from the feed rollers 14a–b. If the plug still remains, the user will repeat the above process until the baler 12 can be operated again.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A baler plug removing system attachable and operable within a baler, comprising:

a pair of tracks that are attachable in spaced apart relation within said baler;

a support member movably positioned traversely between said pair of tracks;

a first reciprocating blade member having a hay engaging portion slidably positioned upon said support member, wherein said hay engaging portion is extendable near a pair of hay feed rollers on said baler; and a reciprocally movable extension/retraction mechanism connected to the support member for moving the support member along the pair of tracks in a hay extracting motion.

2. The baler plug removing system of claim 1, including a plurality of wheels attached to opposing ends of said support member for rotatably engaging said pair of tracks.

3. The baler plug removing system of claim 2, including a pair of front bearings rotatably attached to said support member, wherein said pair of front bearings rotatably engage said pair of tracks.

4. The baler plug removing system of claim 3, including a pair of rear bearings rotatably attached to said support member, wherein said pair of rear bearings rotatably engage said pair of tracks.

5. The baler plug removing system of claim 4, wherein said pair of tracks each include a lip member for engaging said front bearings and said rear bearings.

6. The baler plug removing system of claim 1, including a first reciprocating mechanism for moving said first blade member from side to side during engaging of hay between a pair of hay feed rollers on a baler.

7. The baler plug removing system of claim 1, including a second blade member extending orthogonally with respect to said first blade member.

8. The baler plug removing system of claim 7, including a second reciprocating mechanism for moving said second blade member from side to side during engaging of hay between a pair of hay feed rollers on a baler.

9. The baler plug removing system of claim 6, wherein said first blade member is comprised of a sickle bar slidably positioned upon a support member, a plurality of sickle blades attached to said sickle bar, and a plurality of sickle guards attached to said support member for retaining said sickle bar and said plurality of sickle blades.

10. The baler plug removing system of claim 1, wherein said wherein said extension/retraction mechanism comprises at least one hydraulic cylinder.

11. A baler plug removing system attachable and operable within a conventional baler, comprising:
    a pair of tracks that are attachable to a baler;
    a first blade member having hay engaging portion movably positioned between said pair of tracks, wherein said hay engaging portion is extendable near a pair of feed rollers on said baler;
    wherein said first blade member is comprised of a plurality of blade portions; and
    an extension/retraction means connected to said first blade member for moving said first blade member along said pair of tracks.

12. The baler plug removing system of claim 11, including a plurality of wheels attached to opposing ends of said first blade member for rotatably engaging said pair of tracks.

13. The baler plug removing system of claim 12, including a pair of front bearings rotatably attached to said first blade member adjacent said engaging face, wherein said pair of front bearings rotatably engage said pair of tracks.

14. The baler plug removing system of claim 11, wherein said plurality of blade portions are comprised of a plurality of sickle blades.

15. The baler plug removing system of claim 11, wherein said plurality of blade portions are tapered.

16. The baler plug removing system of claim 11, wherein said plurality of blade portions are syncline shaped.

17. The baler plug removing system of claim 16, wherein said first blade member is comprised of a sickle bar slidably positioned upon a support member, a plurality of sickle blades attached to said sickle bar, and a plurality of sickle guards attached to said support member for retaining said sickle bar and said plurality of sickle blades.

18. The baler plug removing system of claim 11, including a second blade member extending orthogonally with respect to said first blade member.

19. The baler plug removing system of claim 18, including a second reciprocating mechanism for moving said second blade member from side to side during engaging of hay between a pair of hay feed rollers on a baler.

20. The baler plug removing system of claim 11, wherein said wherein said extension/retraction mechanism comprises at least one hydraulic cylinder.

21. A baler plug removing system attachable and operable within a conventional baler, comprising:
    a first blade member having a hay engaging portion, wherein said engaging portion is extendable near a pair of hay feed rollers on a baler;
    a first reciprocating mechanism for moving said first blade member from side to side;
    a reciprocally movable extension/retraction mechanism connected to the first blade member for moving the first blade member in a hay extracting motion with respect to a pair of hay feed rollers on a baler.

22. The baler plug removing system of claim 21, including a pair of tracks attachable to a baler and a plurality of wheels attached to opposing ends of said first blade member for rotatably engaging said pair of tracks.

23. The baler plug removing system of claim 22, including a pair of front bearings rotatably attached to said first blade member, wherein said pair of front bearings rotatably engage said pair of tracks.

24. The baler plug removing system of claim 23, including a pair of rear bearings rotatably attached to said first blade member, wherein said pair of rear bearings rotatably engage said pair of tracks.

25. The baler plug removing system of claim 24, wherein said pair of tracks each include a lip member for engaging said front bearings and said rear bearings.

26. The baler plug removing system of claim 21, wherein said first blade member is comprised of a plurality of blade portions.

27. The baler plug removing system of claim 26, wherein said first blade member is comprised of a sickle bar slidably positioned upon a support member, a plurality of sickle blades attached to said sickle bar, and a plurality of sickle guards attached to said support member for retaining said sickle bar and said plurality of sickle blades.

28. The baler plug removing system of claim 21, including a second blade member extending orthogonally with respect to said first blade member.

29. The baler plug removing system of claim 28, including a second reciprocating mechanism for moving said second blade member from side to side during engaging of hay between a pair of hay feed rollers on a baler.

30. The baler plug removing system of claim 21, wherein said wherein said extension/retraction mechanism comprises at least one hydraulic cylinder.

* * * * *